US008782502B2

(12) United States Patent
Buckley

(10) Patent No.: US 8,782,502 B2
(45) Date of Patent: Jul. 15, 2014

(54) SOFT DECODING OF CRC COMPONENT CODES

(75) Inventor: Michael Eoin Buckley, Grayslake, IL (US)

(73) Assignee: Blackberry Limited, Waterloo, Ontario (CA)

( * ) Notice: Subject to any disclaimer, the term of this patent is extended or adjusted under 35 U.S.C. 154(b) by 196 days.

(21) Appl. No.: 13/357,890

(22) Filed: Jan. 25, 2012

(65) Prior Publication Data

US 2012/0192042 A1 Jul. 26, 2012

Related U.S. Application Data

(60) Provisional application No. 61/436,380, filed on Jan. 26, 2011.

(51) Int. Cl.
*H03M 13/03* (2006.01)

(52) U.S. Cl.
USPC .............................. 714/795; 714/786; 714/796

(58) Field of Classification Search
USPC .......... 714/795, 786, 756, 758, 796, 763, 751
See application file for complete search history.

(56) References Cited

U.S. PATENT DOCUMENTS

| 5,771,239 A | * | 6/1998 | Moroney et al. | 370/474 |
| 6,438,723 B1 | * | 8/2002 | Kalliojarvi | 714/751 |

OTHER PUBLICATIONS

International Search Report and Written Opinion for PCT Application No. PCT/US2012/022489, dated Apr. 27, 2012.
Zhu et al., A Novel Hybrid Coding Scheme, 2003 IEEE 58th Vehicular Technology Conference, Oct. 6-9, 2003.
Wang et al., CRC-Assisted Error Correction in a Convolutionally Coded System, IEEE Transactions on Communications, vol. 56, No. 11, Nov. 2008.
Layland, J.W., Variable Length Short Constraint-Length Convolutional Codes: A Comparison of Maximum Likelihood and Sequential Decoding, JPL Technical Report 32-1526, vol. IX, The Deep Space Network Progress Report, TR 32-1526, Mar. and Apr. 1972, pp. 97-102.
PCT International Preliminary Report and Written Opinion; International Application No. PCT/US2012/022489; International Filing Date: Jan. 25, 2012; Date of Mailing: Jul. 30, 2013; pp. 1-9.

* cited by examiner

*Primary Examiner* — Fritz Alphonse
(74) *Attorney, Agent, or Firm* — Cantor Colburn LLP

(57) ABSTRACT

Methods and devices are disclosed for encoding and decoding convolutional codes in a communication system. In various embodiments of the disclosure, a codeword comprises message data and parity data. A convolutional codeword is generated by multiplying the message data and the parity data with a convolutional polynomial. The convolutional codeword may be decoded by a convolutional code decoder that uses the convolutional polynomial and a maximum likelihood divisor to obtain a maximum likelihood message from the convolutional codeword.

14 Claims, 7 Drawing Sheets

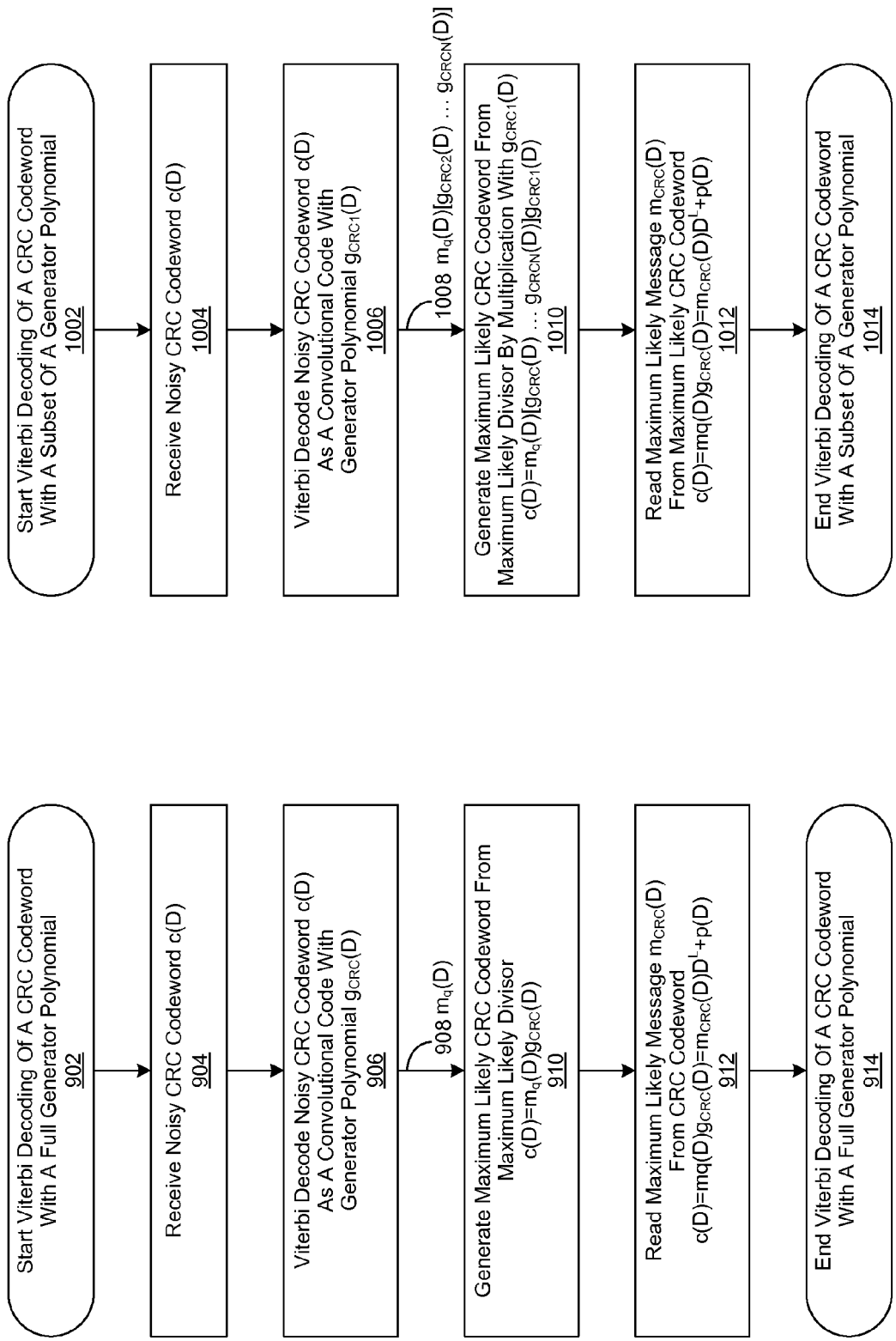

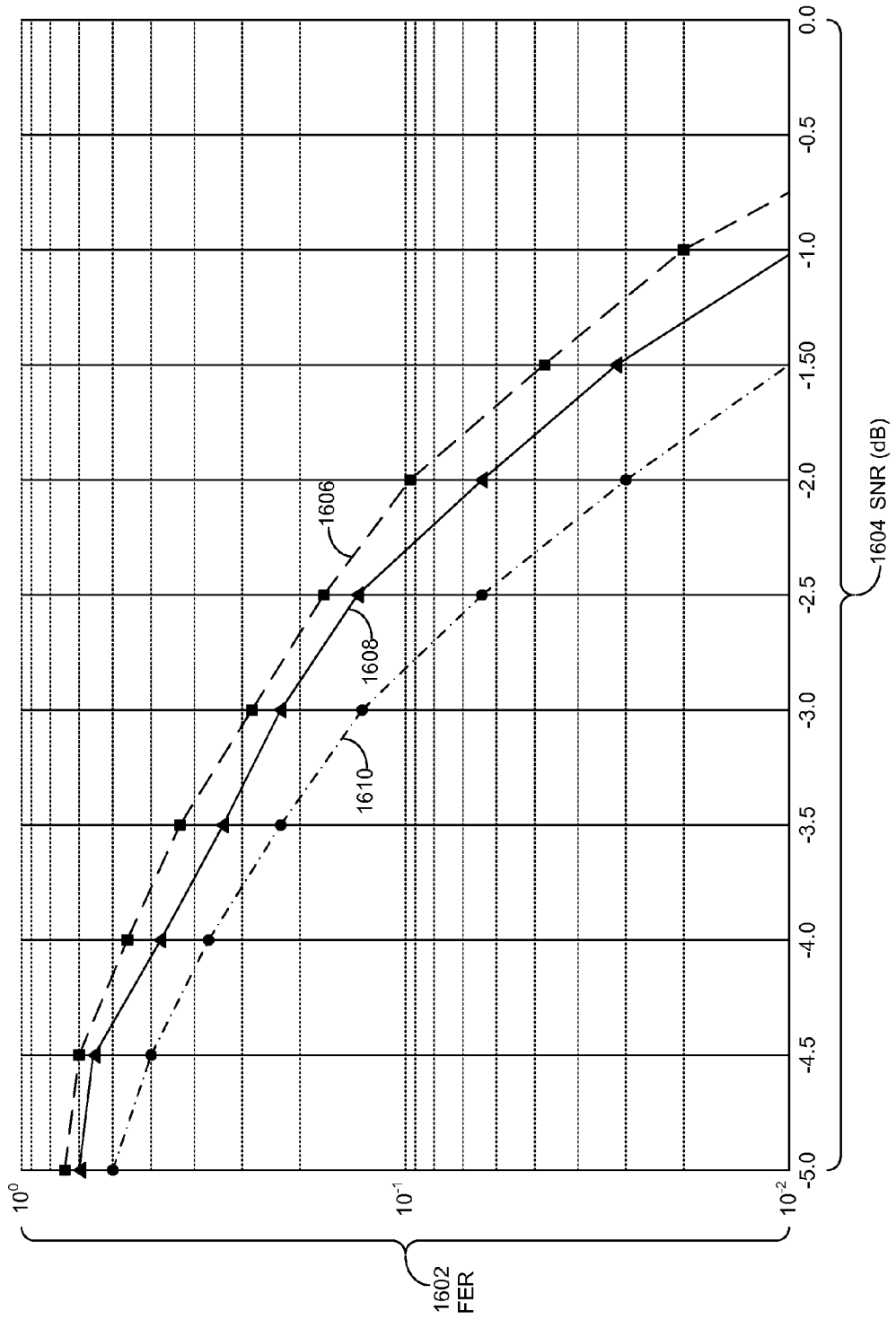

SOFT DECODING OF CRC COMPONENT CODES

CROSS-REFERENCE TO RELATED APPLICATION

This application claims the benefit under 35 U.S.C. §119(e) of U.S. Provisional Application No. 61/436,380, filed Jan. 26, 2011, entitled "Soft Decoding Of CRC Component Codes." U.S. Provisional Application No. 61/436,380 includes exemplary systems and methods and is incorporated by reference in its entirety.

BACKGROUND OF THE INVENTION

1. Field of the Invention

The present invention is directed in general to communications systems and methods for operating such systems. In one aspect, the present invention relates to the methods, systems and devices for improved decoding of convolutional codes.

2. Description of the Related Art

The most common form of encoding currently used in wireless communication channels is the serial concatenation of an inner cyclic redundancy check (CRC) code followed by an outer forward error correction code (FEC). One example of FEC code is the convolutional code which is used in many wireless channels in Global System for Mobile Communications (GSM)/Enhance Data rates for GSM Evolution (EDGE) second-generation (2G), Universal Mobile Telecommunications System (UMTS) third-generation (3G), and Long Term Evolution (LTE) fourth-generation (4G) mobile telecommunication technologies. Traditionally, FEC code is used to attempt correction of any errors during transmission over a wireless channel, while the use of CRC code is normally limited to detection of the existence of residual errors after FEC decoding. In practice, a CRC codeword is formed by computing parity bits and placing them at the end of an input message. Since the message forms part of the codeword itself, the CRC code is referred to as a systematic code.

Such convolutional codes are specified for use in the wireless standards in mainstream use today. One reason for their popularity is the existence of the Viterbi decoder, which determines the maximum likelihood of the accuracy of a transmitted message in an efficient and relatively uncomplicated manner. However, due to the success of the Viterbi decoder and its efficient implementation of the CRC portion of the CRC/Convolutional code concatenation, it is often ignored during error correction. Indeed, the CRC code is generally relegated to the purpose of residual error detection after convolutional decoding. As a result, error correction decoding is typically restricted to the use of convolutional code alone, even though it is recognized that CRC/convolutional code concatenation can provide more robust error correction performance.

Current approaches to decoding CRC/convolutional code include called-list decoding, where the Viterbi decoder is modified to output the 'N' most likely convolutional code messages. The CRC check is successively applied to these 'N' convolutional code messages until one passes, in which case it is accepted as being the transmitted message, or alternatively, none pass and decoder failure is declared. However, this approach has attendant drawbacks. First, the Viterbi decoder implementation requires significant modification to support the output of the 'N' maximum likely convolutional code messages. Second, the decoding of CRC and convolutional codes occurs separately and not jointly, and third, the complexity of list decoding increases linearly with 'N.'

In view of the foregoing, it is apparent that there is a need for systems and methods for improved Viterbi decoding of convolutional codes for error correction.

BRIEF DESCRIPTION OF THE DRAWINGS

The present invention may be understood, and its numerous objects, features and advantages obtained, when the following detailed description is considered in conjunction with the following drawings, in which:

FIG. 9 is a generalized flowchart of an implementation of Viterbi decoding to decode convolutional code with a full generator polynomial;

FIG. 10 is a generalized flowchart of an implementation of Viterbi decoding to decode convolutional code with a subset of a generator polynomial;

FIG. 16 is a graphical representation of improved decoding performance realized from the implementation of convolutional coding.

DETAILED DESCRIPTION

Figure 1:
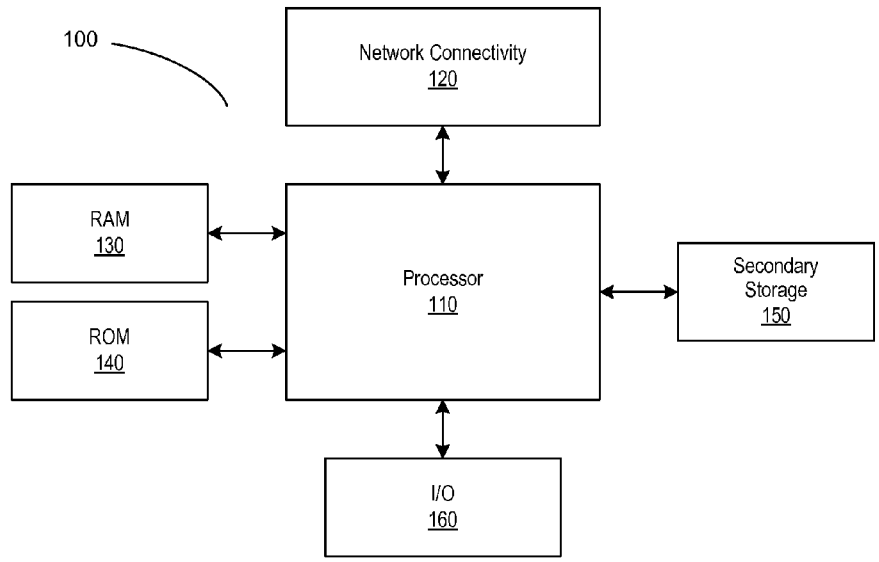
FIG. 1 depicts an exemplary system in which the present invention may be implemented.

A method and system are provided for improved Viterbi decoding of convolutional code for error correction. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As used herein, the terms "user equipment" and "UE" can refer to wireless devices such as mobile telephones, smart phones, personal digital assistants (PDAs), handheld or laptop computers, and similar devices or other user equipment that has telecommunications capabilities. In some embodiments, the term "UE" may refer to a mobile, wireless device. The term "UE" may also refer to devices that have similar capabilities but that are not generally transportable, such as desktop computers, set-top boxes, sensors, or network nodes.

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity devices 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity devices 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity devices 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks, including Personal Area Networks (PANs) such as Bluetooth. These network connectivity devices 120 may enable the processor 110 to communicate with the Internet or one or more telecommunications networks or other networks from which the processor 110 might receive information or to which the processor 110 might output information.

The network connectivity devices 120 may also be capable of transmitting or receiving data wirelessly in the form of electromagnetic waves, such as radio frequency signals or microwave frequency signals. Information transmitted or received by the network connectivity devices 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may be used to store instructions and perhaps data that are read during execution of the instructions. Access to both RAM 130 and ROM 140 is typically faster than to secondary storage 150. The secondary storage 150 is typically comprised of one or more disk drives or tape drives and may be used for non-volatile storage of data or as an over-flow data storage device if RAM 130 is not large enough to hold all working data. Secondary storage 150 may be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
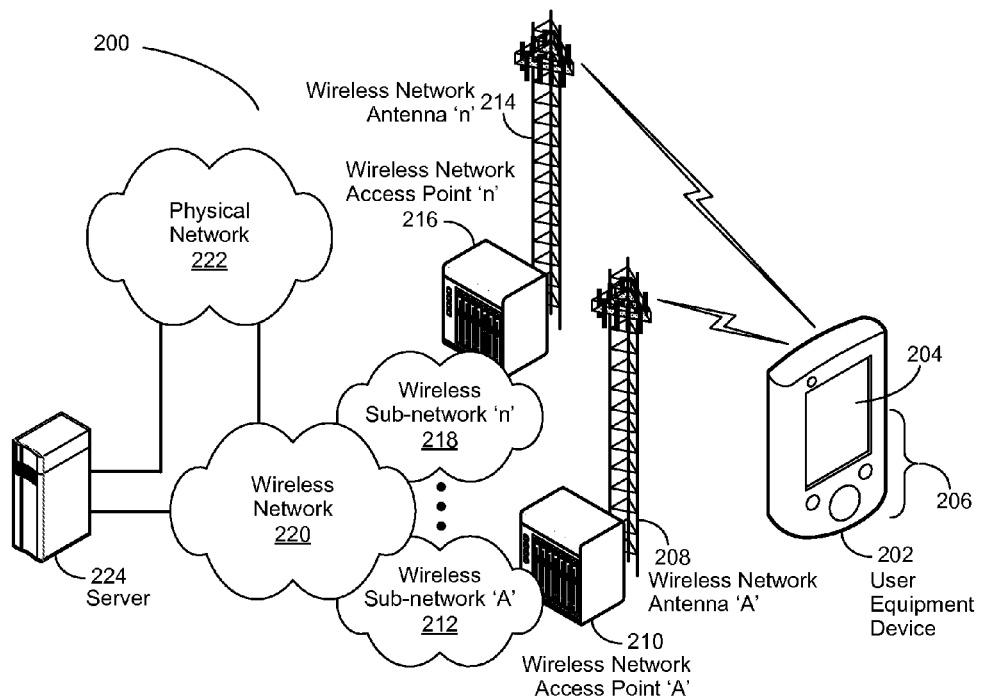
FIG. 2 shows a wireless communications system including an embodiment of a user equipment (UE) device.

FIG. 2 shows a wireless communications system including an embodiment of a user equipment (UE) device. Though illustrated as a mobile phone, the UE device 202 may take various forms including a mobile phone, a wireless handset, a pager, or a personal digital assistant (PDA). In various embodiments, the UE device 202 may also comprise a portable computer, a tablet computer, a laptop computer, or any computing device operable to perform data communication operations. Many suitable devices combine some or all of these functions. In some embodiments, the UE device 202 is not a general purpose computing device like a portable, laptop, or tablet computer, but rather is a special-purpose communications device such as a telecommunications device installed in a vehicle. The UE device 202 may likewise be a device, include a device, or be included in a device that has similar capabilities but that is not transportable, such as a desktop computer, a set-top box, or a network node. In these and other embodiments, the UE device 202 may support specialized activities such as gaming, inventory control, job control, task management functions, and so on.

In various embodiments, the UE device 202 includes a display 204. In these and other embodiments, the UE device 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The UE device 202 may likewise present options for the user to select, controls for the user to actuate, and cursors or other indicators for the user to direct.

The UE device 202 may further accept data entry from the user, including numbers to dial or various parameter values for configuring the operation of the UE device 202. The UE device 202 may further execute one or more software or firmware applications in response to user commands. These applications may configure the UE device 202 to perform various customized functions in response to user interaction. Additionally, the UE device 202 may be programmed or configured over-the-air (OTA), for example from a wireless network access point 'A' 210 through 'n' 216 (e.g., a base station), a server 224, or a peer UE device 202.

Among the various applications executable by the UE device 202 are a web browser, which enables the display 204 to display a web page. The web page may be obtained from a server 224 through a wireless connection with a wireless network 220. The various applications may likewise be obtained from a peer UE device 202 or other system over a connection to the wireless network 220 or any other wireless communication network or system. In various embodiments, the wireless network 220 comprises a plurality of wireless sub-networks (e.g., cells) 'A' 212 through 'n' 218. In these and other embodiments, the UE device 202 establishes a wireless communication session with wireless network antenna 'A' 208 through 'n' 214 (e.g., a cell tower), which are respectively coupled to a wireless network access point 'A' 210 through 'n' 216. In turn, the wireless network access points 'A' 210 through 'n' 216 are respectively coupled to wireless sub-networks 'A' 212 through 'n' 218, which are connected to the wireless network 220.

In various embodiments, the wireless network 220 is coupled to a physical network 222, such as the Internet. Via the wireless network 220 and the physical network 222, the UE device 202 has access to information on various servers, such as the server 224. The server 224 may provide content that may be shown on the display 204. Alternately, the UE device 202 may access the wireless network 220 through a peer UE device 202 acting as an intermediary, in a relay type or hop type of connection. Alternately, the UE device 202 is tethered and obtains its data from a tethered device that is connected to the wireless network 212. Skilled practitioners of the art will recognize that many such embodiments are possible and the foregoing is not intended to limit the spirit, scope, or intention of the disclosure.

Figure 3:
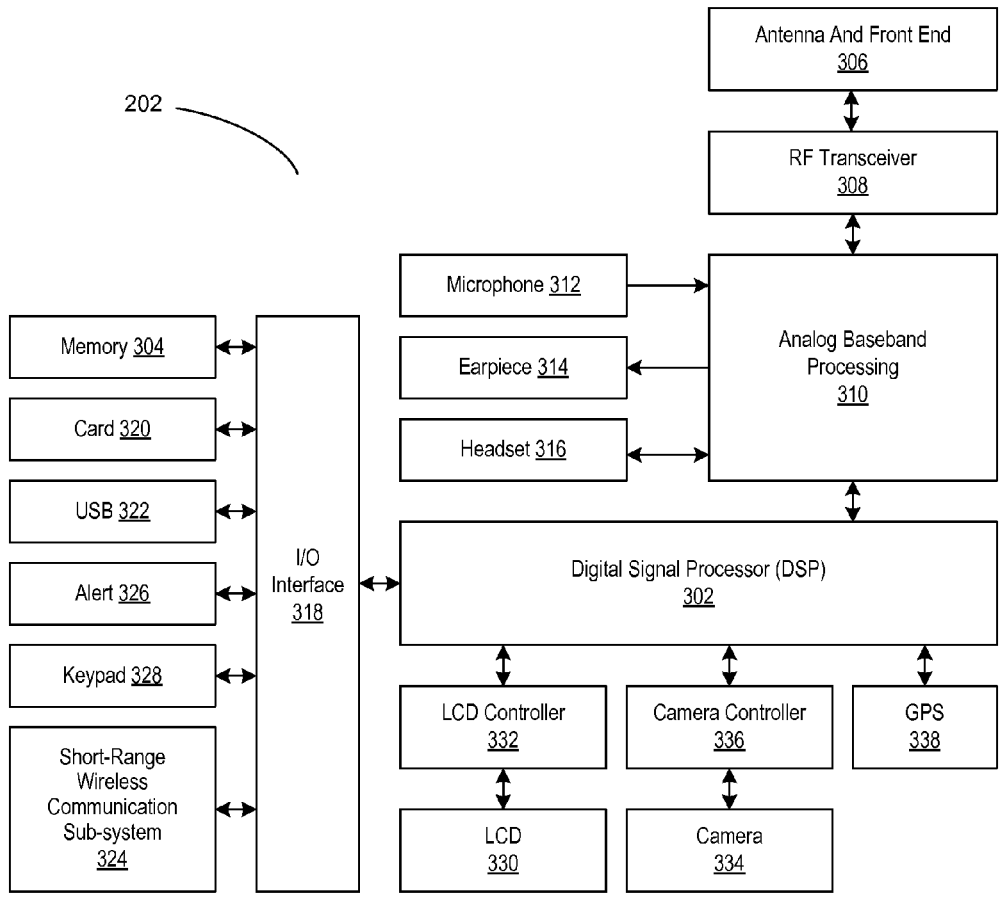
FIG. 3 is a simplified block diagram of an exemplary UE device comprising a digital signal processor (DSP)

FIG. 3 depicts a block diagram of an exemplary user equipment (UE) device 202 in which the present invention may be implemented. While various components of a UE device 202 are depicted, various embodiments of the UE device 202 may include a subset of the listed components or additional components not listed. As shown in FIG. 3, the UE device 202 includes a digital signal processor (DSP) 302 and a memory 304. As shown, the UE device 202 may further include an antenna and front end unit 306, a radio frequency (RF) transceiver 308, an analog baseband processing unit 310, a microphone 312, an earpiece speaker 314, a headset port 316, an input/output (I/O) interface 318, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338. In various embodiments, the UE device 202 may include another kind of display that does not provide a touch sensitive screen. In an embodiment, the DSP 302 may communicate directly with the memory 304 without passing through the input/output interface 318.

In various embodiments, the DSP 302 or some other form of controller or central processing unit (CPU) operates to control the various components of the UE device 202 in accordance with embedded software or firmware stored in memory 304 or stored in memory contained within the DSP 302 itself In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the UE device 202 to send and receive information from a cellular network or some other available wireless communications network or from a peer UE device 202. In an embodiment, the antenna and front end unit 106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the UE device 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the UE device 202 and may also enable the UE device 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the UE device 202 to communicate wirelessly with other nearby mobile devices and/or wireless base stations.

The input/output interface 318 may further connect the DSP 302 to the alert 326 that, when triggered, causes the UE device 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the UE device 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the UE device 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals, thereby enabling the UE device 202 to determine its position. Various other peripherals may also be included to provide additional functions, such as radio and television reception.

Figure 4:
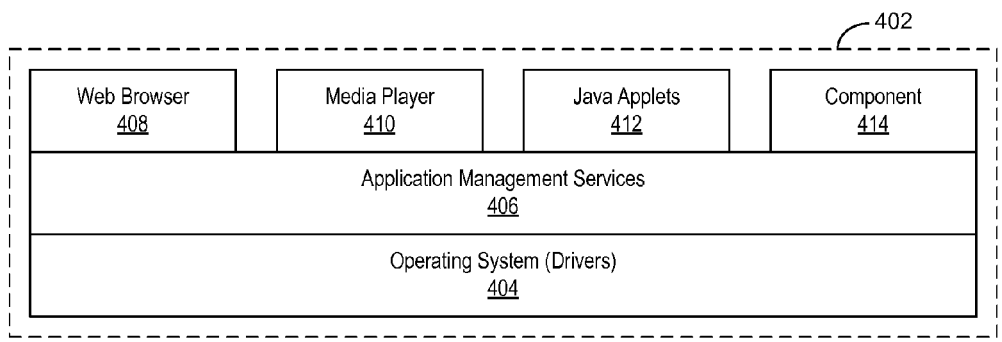
FIG. 4 is a simplified block diagram of a software environment that may be implemented by the DSP.

FIG. 4 illustrates a software environment 402 that may be implemented by the DSP 302. The DSP 302 executes operating system drivers 404 that provide a platform from which the rest of the software operates. The operating system drivers 404 provide drivers for the UE device 202 hardware with standardized interfaces that are accessible to application software. The operating system drivers 404 include application management services (AMS) 406 that transfer control between applications running on the UE device 202. Also shown in FIG. 4 are a web browser application 408, a media player application 410, and Java applets 412. The web browser application 408 configures the UE device 202 to operate as a web browser, allowing a user to enter information into forms and select links to retrieve and view web pages. The media player application 410 configures the UE device 202 to retrieve and play audio or audiovisual media. The Java applets 412 configure the UE device 202 to provide games, utilities, and other functionality. A component 414 might provide functionality described herein. In various embodiments, the UE device 202, the wireless network access point 'A' 210 through 'n' 216, the server 224, and other components described herein might likewise include a processing component that is capable of executing instructions related to the actions described above.

Figure 5:
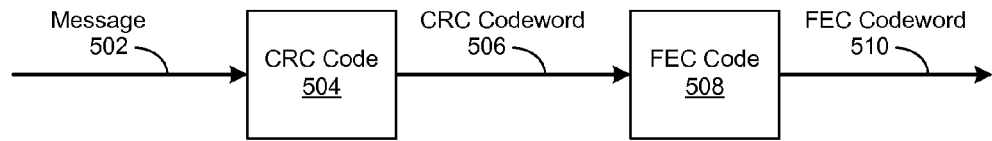
FIG. 5 is a simplified block diagram of a serial concatenation of an inner cyclic redundancy check (CRC) code, followed by an outer forward error correction code (FEC)

FIG. 5 is a simplified block diagram of a serial concatenation of an inner cyclic redundancy check (CRC) code, followed by an outer forward error correction code (FEC), as implemented in accordance with an embodiment of the invention. As shown in FIG. 5, a message 502 is processed with CRC code 504 to generate a CRC codeword 506. In turn, the CRC codeword 506 is processed with FEC code 508 to generate an FEC codeword 510. Skilled practitioners of the art will be familiar with the use of FEC code 508, which is used to attempt correction of any errors during transmission over a wireless channel. In contrast, the use of CRC code 504 is normally limited to detection of the existence of residual errors after FEC decoding.

Figure 6:
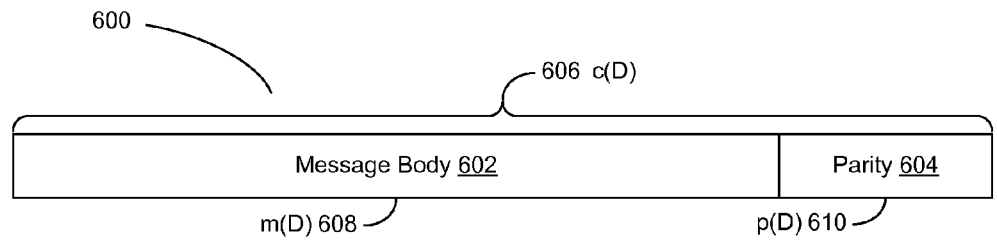
FIG. 6 is a simplified block diagram of a CRC codeword.

FIG. 6 is a simplified block diagram of a cyclic redundancy check (CRC) codeword as implemented in an embodiment of the invention. In this embodiment, the CRC codeword 600 is formed by computing parity bits 604 and placing them at the end of the message body 602. Since the message body 602 forms part of the codeword 600, the CRC code is a systematic code. Those of skill in the art will be aware that it is often convenient to describe a sequence of bits as a polynomial when manipulating codewords. As shown in FIG. 6, c(D) 606 represents the codeword polynomial, m(D) 608 represents the message polynomial, and p(D) 610 represents the parity polynomial.

The construction of the polynomial is based on the non-zero elements in a bit vector. More exactly a polynomial contains $D^n$ if the nth element of the bit vector contains a '1.' As an example, the non-zero elements occupy the $0^{th}$, 4, 5, and $6^{th}$ positions of the message bit vector: 1 0 0 0 1 1 1, resulting message polynomial m(D) 608 taking the form: $m(D)=1+D^4+D^5+D^6$. In turn, the CRC parity polynomial p(D) 610 is generated using a generator polynomial g(D) such that the CRC codeword c(D) 606 is divisible by the generator polynomial g(D). Letting the divisor be $m_q(D)$ and letting the degree of the generator polynomial $g_{CRC}(D)$ be L, then p(D) 610 is constructed such that:

$$c(D)=m_q(D)g_{CRC}(D)=m(D)D^L+p(D) \quad \text{Equation 1}$$

From the foregoing, it will be apparent to skilled practitioners of the art that every CRC codeword c(D) 606 is equal to some divisor $m_q(D)$ multiplied by the CRC generator polynomial $g_{CRC}(D)$.

As previously described, the CRC generator is referenced as the polynomial $g_{CRC}(D)$. In general, this polynomial can be subdivided into several constituent polynomials $g_{CRC}(D)=g_{CRC1}(D), g_{CRC2}(D) \ldots g_{CRCN}(D)$, where each constituent polynomial $g_{CRCi}(D)$ is irreducible. Therefore the description of the CRC codeword c(D) in equation 1 can be further generalized to:

$$c(D)=m_q(D)g_{CRC}(D)=m_q(D)[g_{CRC1}(D)g_{CRC2}(D) \ldots g_{CRCN}(D)]=m(D)D^L+p(D) \quad \text{Equation 2}$$

Figure 7:
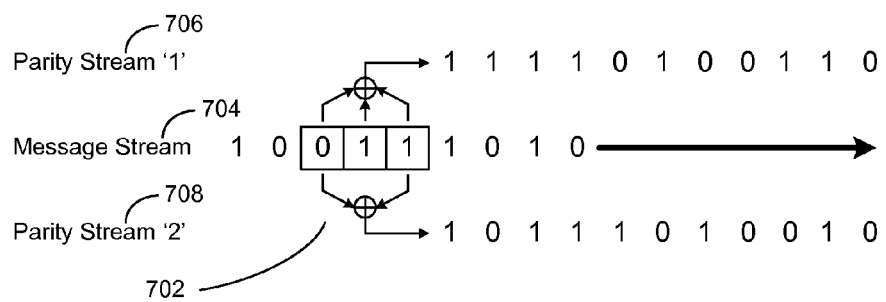
FIG. 7 is a simplified illustration of a convolutional encoder.

FIG. 7 is a simplified illustration of a convolutional encoder as implemented in accordance with an embodiment of the invention. In this embodiment, a convolutional encoder 702, similar to CRC codes, produces parity information as part of the convolutional codeword. As shown in FIG. 7, a single message stream 704 input is encoded by the convolutional encoder 702 to respectively generate parity streams '1' 706 and '2' 708, which together form a convolutional codeword.

Figure 8:
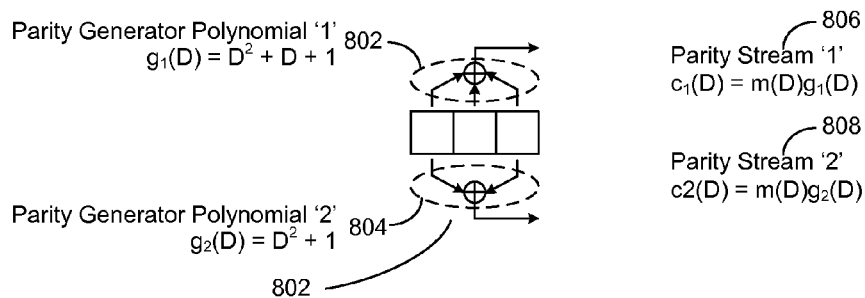
FIG. 8 is a simplified illustration of parity generator polynomials as implemented with a convolutional encoder to generate corresponding parity streams.

FIG. 8 is a simplified illustration of parity generator polynomials as implemented with a convolutional encoder in accordance with an embodiment of the invention to generate corresponding parity streams. In this embodiment, parity generator polynomials '1' 802 and '2' 804 are used by a convolutional encoder 802 to respectively generate parity streams '1' 806 and '2' 808. As shown in FIG. 7, convolutional codes are defined by generator polynomials, such as $g_1(D)=D^2+D+1$ for parity generator polynomial '1' 802 and $g_2(D)=D^2+D+1$ for parity generator polynomial '2' 804. However, the parity streams '1' 806 and '2' 808 generated by the convolutional encoder 802 result from the polynomial multiplication of the generator polynomials '1' 802 and '2' 804 with the message m(D) rather than some divisor $m_q(D)$. Accordingly, the resulting parity streams '1' 806 and '2' 808 are represented by the following equations:

$$c_1(D)=m(D)g_1(D) \quad \text{Equation 3}$$

$$c_2(D)=m(D)g_2(D) \quad \text{Equation 4}$$

FIG. 9 is a generalized flowchart of an implementation of Viterbi decoding in accordance with an embodiment of the invention to decode convolutional code with a full generator polynomial. In this and other embodiments, Viterbi decoding is used for decoding of convolutional code. In various other embodiments, other convolutional decoders are implemented. Accordingly, the use of Viterbi coding herein is not intended to limit the spirit, scope or intent of the invention.

As described in greater detail herein, a CRC codeword can be viewed as the multiplication of some divisor $m_q(D)$ with the CRC generator polynomial $g_{CRC}(D)$, which is represented as:

$$c(D)=m_q(D)g_{CRC}(D)=m_{CRC}(D)D^L+p(D). \quad \text{Equation 5}$$

Likewise, a convolutional codeword can be viewed as the multiplication of the message m(D) with the convolutional code generator polynomials, which are represented as:

$$c_1(D)=m(D)g_1(D) \quad \text{Equation 6}$$

$$c_2(D)=m(D)g_2(D) \quad \text{Equation 7}$$

Therefore, a CRC codeword can be treated as a single parity stream convolutional code with generator polynomial $g_{CRC}(D)$. Furthermore, the Viterbi decoder can be used to efficiently determine the maximum likely divisor $m_q(D)$. Once the maximum likely divisor is known, the associated maximum likely CRC message $m_{CRC}(D)$ can be determined by regenerating the maximum likely CRC codeword c(D) by the multiplication $m_q(D)g_{CRC}(D)$ and reading $m_{CRC}(D)$ from the systematic portion of the resulting CRC codeword.

Referring now to FIG. 9, Viterbi decoding of a CRC codeword is begun in step 902, followed by the receipt of a noisy CRC codeword c(D) in step 904. The noisy CRC codeword c(D) is then Viterbi decoded in step 906 as a convolutional code with a generator polynomial $g_{CRC}(D)$, which yields a maximum likely divisor $m_q(D)$ 908. Thereafter, a maximum likely CRC codeword is generated in step 910 from the maximum likely divisor, where $c(D)=m_q(D)g_{CRC}(D)$. The maximum likely message $m_{CRC}(D)$ is then read in step 912 from the CRC codeword, where $c(D)=m_q(D)g_{CRC}(D)=m_{CRC}(D)D^L+p(D)$. Viterbi decoding of a CRC codeword is then ended in step 914.

FIG. 10 is a generalized flowchart of an implementation of Viterbi decoding in accordance with an embodiment of the invention to decode convolutional code with a subset of a generator polynomial. As described in greater detail herein, the CRC generator polynomial consists of a plurality of constituent polynomials, where $g_{CRC}(D)=g_{CRC1}(D)g_{CRC2}(D) \ldots g_{CRCN}(D)$. In this embodiment, a subset of theses constituent polynomials are used to define the Viterbi decoder during Viterbi decoding, rather than using the full CRC generator polynomial described in the descriptive text of FIG. 9. As shown in FIG. 10, the Viterbi decoder is defined as a convolutional code with generator $g_{CRC1}(D)$. Accordingly, the Viterbi decoder outputs the maximum likely divisor $m_q(D)[g_{CRC2}(D) \ldots g_{CRCN}(D)]$ 1008.

Referring now to FIG. 10, Viterbi decoding of a CRC codeword with a subset of a generator polynomial is begun in step 1002, followed by the receipt of a noisy CRC codeword c(D) in step 1004. The noisy CRC codeword c(D) is then Viterbi decoded in step 1006 as a convolutional code with a subset of a generator polynomial $g_{CRC1}(D)$, which yields a maximum likely divisor $m_q(D)[g_{CRC2}(D) \ldots g_{CRCN}(D)]$ 908. Thereafter, a maximum likely CRC codeword is generated in step 1010 by multiplication with $g_{CRC1}(D)$, where $(D)=m_q(D)[g_{CRC}(D) \ldots g_{CRCN}(D)]g_{CRC1}(D)$. The maximum likely message $m_{CRC}(D)$ is then read in step 1012 from the CRC codeword, where $c(D)=m_q(D)g_{CRC}(D)=m_{CRC}(D)D^L+p(D)$. Viterbi decoding of a CRC codeword is then ended in step 914.

Figure 11:
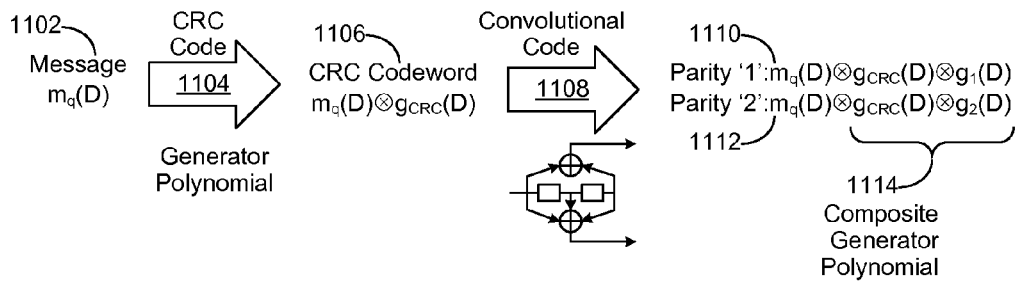
FIG. 11 is a simplified block diagram of a CRC/convolutional code concatenation implemented as a single composite convolutional code.

FIG. 11 is a simplified block diagram of a CRC/convolutional code concatenation implemented as a single composite convolutional code in accordance with an embodiment of the invention. In this embodiment, a CRC/Convolutional code concatenation is implemented as a single parity stream convolutional code, which allows the CRC/Convolutional code concatenation to be processed as a single composite convolutional code. As illustrated in FIG. 11, a message $m_q(D)$ 1102 is processed with a generator polynomial and associated CRC code 1104 to generate a CRC codeword $m_q(D) \otimes g_{CRC}(D)$ 1106. In turn, the resulting CRC codeword 1106 is processed by convolutional code 1108 to generate parity '1' 1110 and '2' 1112, which respectively comprise composite generator polynomials 114 of $g_{CRC}(D)g_1(D)$ and $g_{CRC}(D)g_2(D)$. From the foregoing, it will be apparent that the concatenation of the CRC code 1104, with generator polynomial $g_{CRC}(D)$, with the convolutional code 1108 with generator polynomials $g_1(D)$ and $g_2(D)$ can be viewed as a single convolutional code with generator polynomials $g_{CRC}(D)g_1(D)$ and $g_{CRC}(D)g_2(D)$. Therefore, the Viterbi decoding algorithm can be applied directly to the CRC/convolutional code concatenation by constructing the Viterbi decoder based on the generator polynomials of the composite code.

Figure 12:
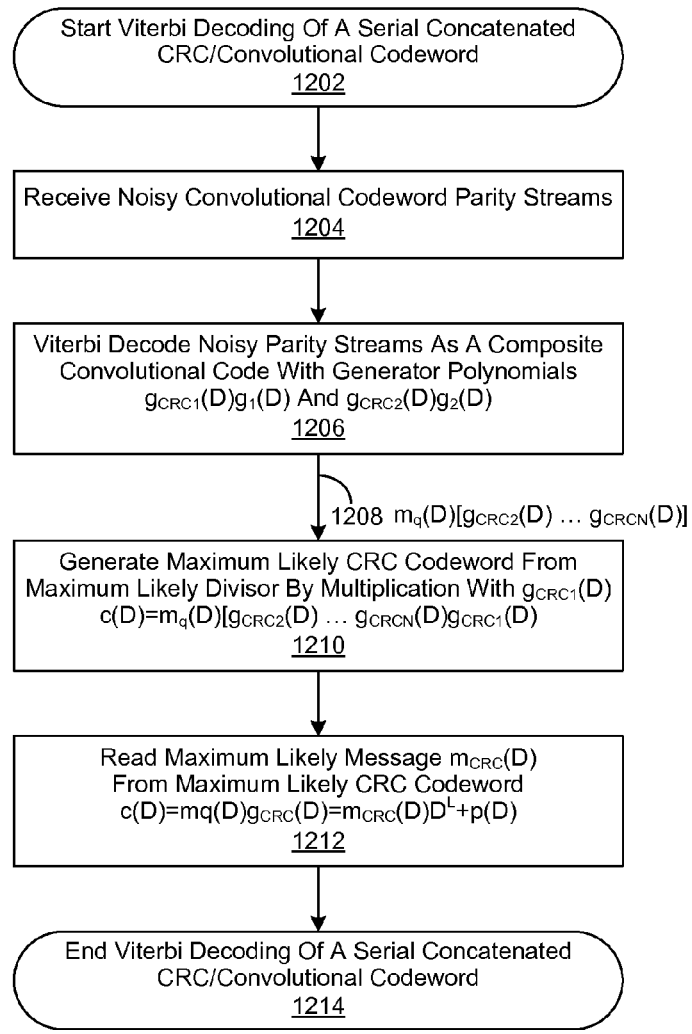
FIG. 12 is a generalized flowchart of an implementation of Viterbi decoding for joint decoding of a serial concatenated CRC/convolutional code.

FIG. 12 is a generalized flowchart of an implementation of Viterbi decoding in accordance with an embodiment of the invention for joint decoding of a serial concatenated CRC/convolutional code. As described in greater detail herein, the CRC generator polynomial consists of a plurality of constituent polynomials, where $g_{CRC}(D)=g_{CRC1}(D)g_{CRC2}(D)\ldots g_{CRCN}(D)$. In this embodiment, a subset of theses constituent polynomials are used to define the Viterbi decoder during Viterbi decoding, rather than using the full CRC generator polynomial described in the descriptive text of FIG. 9. In this embodiment, generator $g_{CRC1}(D)$ is used in forming a composite convolutional code decoder where $g_{CRC}(D)=g_{CRC1}(D)g_{CRC2}(D)\ldots g_{CRCN}(D)$ and where $g_1(D)$ and $g_2(D)$ are the basic convolutional code generator polynomials.

Referring now to FIG. 12, Viterbi decoding of a serial concatenated CRC/convolutional codeword is begun in step 1202, followed by the receipt of noisy convolutional codeword parity streams in step 1204. The noisy convolutional codeword parity streams are then Viterbi decoded in step 1206 as a convolutional code with generator polynomials $g_{CRC1}(D)g_1(D)$ and $g_{CRC2}(D)g_2(D)$, which yields a maximum likely divisor $m_q(D)[g_{CRC2}(D)\ldots g_{CRCN}(D)]$ 1208. Thereafter, a maximum likely CRC codeword is generated in step 1210 by multiplication with $g_{CRC1}(D)$, where $(D)=m_q(D)[g_{CRC2}(D)\ldots g_{CRCN}(D)]g_{CRC1}(D)$. The maximum likely message $m_{CRC}(D)$ is then read in step 1212 from the CRC codeword, where $c(D)=m_q(D)g_{CRC}(D)=m_{CRC}(D)D^L+p(D)$. Viterbi decoding of a serial concatenated CRC/convolutional codeword is then ended in step 1214.

Figure 13:
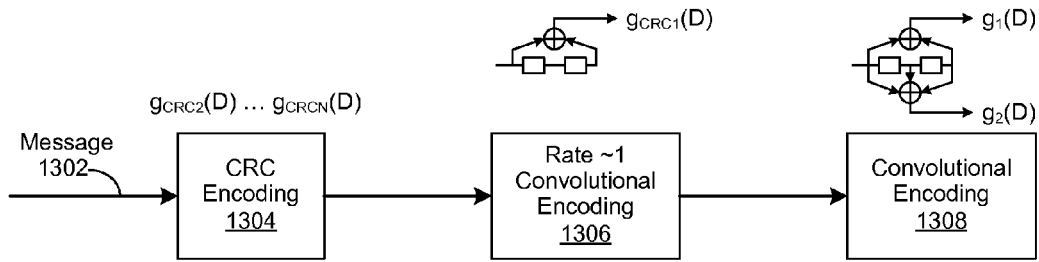
FIG. 13 is a simplified block diagram of explicit convolutional encoding of CRC constituent polynomials.

FIG. 13 is a simplified block diagram of explicit convolutional encoding of CRC constituent polynomials as implemented in accordance with an embodiment of the invention. A characteristic of using a subset of constituent CRC polynomials during Viterbi decoding is that the subset of the CRC generator polynomial used in Viterbi decoding process serves no purpose if it is used in checking for residual errors after decoding. Therefore, in various embodiments, the CRC polynomial is subdivided into two subsets, a first utilized during composite convolutional decoding and a second used for residual error detection. Furthermore, since the equivalence relationship between CRC codes and a rate ~1 convolutional code is now known from Equation 1, where $c(D)=m_q(D)g_{CRC}(D)=m(D)D^L+p(D)$, it follows that a rate ~1 convolutional encoder can be used instead of a CRC encoder. While a different message to codeword mapping is produced, it will still result in the same codeword set, and therefore, a code with the same error detection/correction properties.

Used in conjunction, these characteristics allow the decoding process of composite convolutional code to be further simplified. More specifically, assume the CRC generator polynomial $g_{CRC}(D)=g_{CRC1}(D)g_{CRC2}(D)\ldots g_{CRCN}(D)$ and convolutional code polynomials $g_1(D)$ and $g_2(D)$ are provided as part of an encoding process. If the constituent polynomial $g_{CRC1}(D)$ is used during the composite convolutional code decoding process then one approach is to CRC encode a message using the constituent polynomials $g_{CRC2}(D)\ldots g_{CRCN}(D)$, and to convolutionally encode using the generator polynomials $g_{CRC1}(D)g_1(D)$ and $g_{CRC1}(D)g_2(D)$. In this embodiment, explicit CRC encoding 1304 is performed on message 1302 with the generator $g_{CRC2}(D)\ldots g_{CRCN}(D)$, while rate ~1 convolutional encoding 1306 is performed with $g_{CRC1}(D)$, which results in convolutional encoding $g_1(D)/g_2(D)$ 1308.

Figure 14:
FIG. 14 is a simplified block diagram of explicit convolutional encoding of CRC constituent polynomials.

FIG. 14 is a simplified block diagram of explicit convolutional encoding of CRC constituent polynomials as implemented in accordance with an embodiment of the invention. Skilled practitioners of the art are aware that in some applications, such as data transmission, it is important to retain missed error detection performance. Conversely, in other applications, such as voice transmission, a tradeoff between missed error detection performance and link performance may be realized. In such cases, the transmitter can dynamically switch between the encoding process described in the descriptive text associated with FIG. 13 and a more traditional encoding approach illustrated in FIG. 14 according to the respective needs of the data or voice application. In this embodiment, explicit CRC encoding 1404 is performed on message 1402 with the generator $g_{CRC1}(D)g_{CRC2}(D)\ldots g_{CRCN}(D)$, which results in convolutional encoding $g_1(D)/g_2(D)$ 1408.

Figure 15:
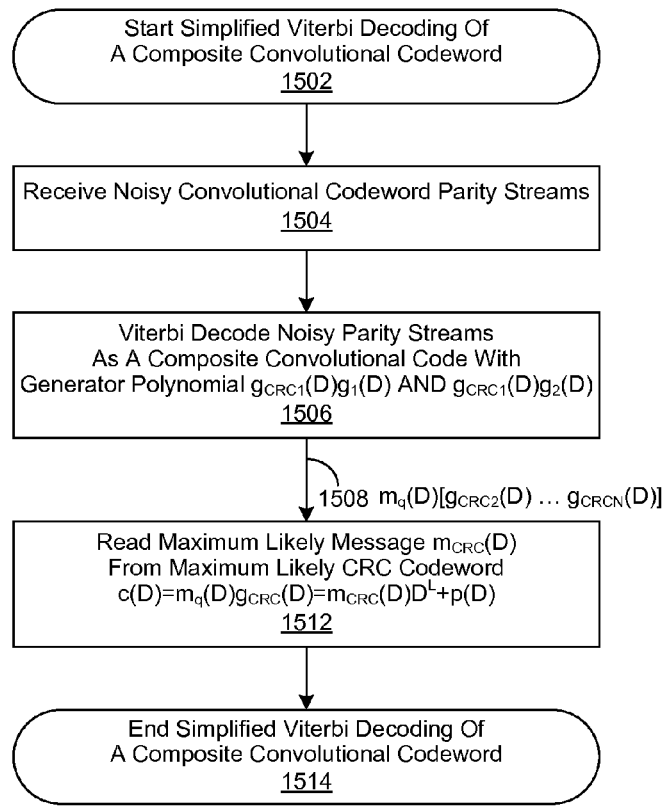
FIG. 15 is a flowchart showing simplified decoding steps in recovering a transmitted message after decoding composite code.

FIG. 15 is a flowchart showing simplified decoding steps in recovering a transmitted message after decoding composite code as implemented in accordance with an embodiment of the invention. Skilled practitioners of the art will realize that knowledge of the encoding steps used at both the transmitter and the receiver must be understood in order to correctly recover a transmitted message. As used in discussion of various embodiments herein, the term "systematic code" will sometimes be used to refer to any error correction code in which the encoder input message data is embedded explicitly in the encoder output codeword. In one embodiment, the encoding method is signaled explicitly via control channel signaling. In another embodiment, the encoding method is signaled implicitly by communicating the application type from which the data was generated and hence the method of encoding used.

Referring now to FIG. 15, simplified Viterbi decoding of a composite convolutional codeword begun in step 1502, followed by the receipt of noisy convolutional codeword parity streams in step 1504. The noisy convolutional codeword parity streams are then Viterbi decoded in step 1506 as a convolutional code with generator polynomials $g_{CRC1}(D)g_1(D)$ and $g_{CRC2}(D)g_2(D)$, which yields a maximum likely divisor $m_q(D)[g_{CRC2}(D)\ldots g_{CRCN}(D)]$ 1508. Thereafter, the maximum likely message $m_{CRC}(D)$ is then read in step 1512 from the CRC codeword, where $c(D)=m_q(D)g_{CRC}(D)=m_{CRC}(D)D^L+p(D)$. Simplified Viterbi decoding of a composite convolutional codeword is then ended in step 1214.

FIG. 16 is a graphical representation of improved decoding performance realized from the implementation of convolutional coding in accordance with an embodiment of the invention. As shown in FIG. 16, a three parity stream convolutional code 1606 with generator polynomials $g_1(D)=1+D^2+D^3+D^5+D^6$, $g_2(D)=1+D+D^2+D^3+D^6$, and $g_3(D)=1+D+D^4+D^6$ is concatenated with a first CRC code 1608 with generator polynomial $(1+D)$ and then with a second CRC code 1610 with generator polynomial $(1+D^2+D^3)$. Simulations were carried out in an AWGN channel. In the case of the first CRC 1608/convolutional code concatenation a 0.3 dB signal to noise ratio (SNR) 1604 gain was observed while in the case of the second CRC 1610/convolutional code concatenation a 0.7 dB SNR 1604 gain was observed along with a corresponding improvement in Frame Error Rate (FER) 1602.

From the foregoing, skilled practitioners of the art will recognize the benefits of the invention when it is applied to CRC/convolutional code concatenations in Viterbi decoding operations. However, since the complexity of Viterbi decoding increases exponentially with the degree of the generator polynomial, a similar increase in complexity will be experienced in the decoding of the composite CRC/convolutional code concatenation as its generator polynomials will be of greater degree than those of the simple convolutional code.

It will likewise be recognized that the invention realizes improved error correcting performance in various embodiments due to the use of CRC polynomials, which can be easily detected by measurement of missed error detection. In these and other embodiments, the degradation of missed error detection performance can be detected if the full CRC polynomial is not used for residual error detection. In one embodiment, hard sequences are inserted into a test decoder (e.g., +/−1 for BPSK) or transmit clean signal to test mobile (no fading or noise) for detection. In this embodiment, transmitted sequences are valid CRC/Convolutional codewords with fixed error sequences. Likewise, error sequences can be chosen such that prior art methods such as convolutional code or list decoding of convolutional code results in decoder failure while composite CRC/convolutional code results in decoder success. In another embodiment, the composite convolutional code is a catastrophic-like code, and as such, will have a significantly higher bit error rate to frame error rate relationship than the more traditional decoding approaches.

As shown in FIG. 16, the invention provides an improvement in error correcting decoding performance Accordingly, the invention can be used for applications where missed error detection performance less than the maximum available from the CRC are acceptable. One example application is the Slow Associated Control Channel (SACCH) and Fast Associated Control Channel (FACCH) control channels in GSM. A degree 40 CRC is available whereas a degree 16 CRC would suffice for missed error detection. A second example is voice over IP (VoIP) transmission in LTE. A 24 degree CRC is used for data transmissions in LTE regardless of data type even though VoIP data can tolerate higher levels of missed detection. Furthermore, the invention can also be used during decoding of tailbiting convolutional codes. In particular, the preliminary stages of tailbiting convolutional decoding concentrate on determining the starting state of the Viterbi decoder. As such, the invention can be used in determining this state without incurring an increase in missed error detection From the foregoing, those of skill in the art will recognize that the invention provides improved decoding performance by using CRC/convolutional code concatenation versus convolutional code alone. The invention likewise provides joint maximum likelihood decoding of the CRC/convolutional code and efficient decoding by using the Viterbi algorithm based upon the generator polynomials of the composite CRC/convolutional code. In addition, increased constraint length of the composite convolutional code is realized when compared with traditional convolutional code.

Although the described exemplary embodiments disclosed herein are described with reference to improved Viterbi decoding of convolutional code for error correction, the present invention is not necessarily limited to the example embodiments which illustrate inventive aspects of the present invention that are applicable to a wide variety of authentication algorithms. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

The invention claimed is:

1. A method of applying convolutional code decoding in a communication system, the method comprising:
    receiving a noisy cyclic redundancy check (CRC) codeword;
    performing, using a processing device, Viterbi decoding of said noisy cyclic redundancy check codeword configured for decoding a rate 1 convolutional code comprising a generator polynomial, thereby generating a decoded cyclic redundancy check codeword; and
    processing said decoded cyclic redundancy check code word to generate a maximum likelihood message therefrom.

2. The method of claim 1, wherein said cyclic redundancy check codeword is generated by multiplying a first divisor with a cyclic redundancy check generator polynomial.

3. The method of claim 2, wherein said maximum likelihood message is obtained by reading the systematic portion of the CRC codeword.

4. A communication device comprising processing logic, wherein said processing logic is configured to:
    receive a noisy cyclic redundancy check (CRC) codeword;
    perform Viterbi decoding of said noisy cyclic redundancy check codeword configured for decoding a rate 1 convolutional code comprising a generator polynomial, thereby generating a decoded cyclic redundancy check codeword; and
    process said decoded cyclic redundancy check code word to generate a maximum likelihood message therefrom.

5. The communication device of claim 4, wherein said decoded cyclic redundancy check codeword is generated by multiplying a first divisor with a cyclic redundancy check generator polynomial.

6. The communication device of claim 4, wherein said processing logic is configured to generate said maximum likelihood message by reading the systematic portion of the CRC codeword.

7. A method of recovering a transmitted message in a communication system, the method comprising:
    receiving a noisy parity data stream corresponding to a composite convolutional codeword;
    performing, using a processing device, decoding of said noisy parity data stream using a composite CRC/convolutional code comprising a CRC generator polynomial and a convolutional generator polynomial, thereby generating a decoded composite convolutional codeword; and processing said decoded composite convolutional codeword to generate a maximum likelihood message therefrom.

8. The method of claim 7, wherein said decoding of said recovered cyclic redundancy check codeword is implemented using Viterbi decoding.

9. The method of claim 7, wherein said decoded composite convolutional codeword is generated by multiplying a first divisor with said CRC generator polynomial.

10. The method of claim 7, wherein said maximum likelihood message is obtained by reading the systematic portion of the composite convolutional codeword.

11. A communication device comprising processing logic, wherein said processing logic is configured to:

receive a noisy parity data stream corresponding to a composite convolutional codeword;

perform decoding of said noisy parity data stream using a composite convolutional code CRC/convolutional code generator comprising a CRC generator polynomial and a convolutional generator polynomial, thereby generating a decoded composite convolutional codeword; and process said decoded composite convolutional codeword to generate a maximum likelihood message therefrom.

12. The communication device of claim 11, wherein said decoding of said recovered cyclic redundancy check codeword is implemented using Viterbi decoding.

13. The communication device of claim 11, wherein said decoded composite convolutional codeword is generated by multiplying a first divisor with said CRC generator polynomial.

14. The communication device of claim 11, wherein said maximum likelihood message is obtained by reading the systematic portion of the composite convolutional codeword.

* * * * *